United States Patent [19]

Johansson

[11] Patent Number: 4,809,489

[45] Date of Patent: Mar. 7, 1989

[54] RIDING MOWER

[75] Inventor: Rolf A. G. Johansson, Partille, Sweden

[73] Assignee: Husqvarna Aktiebolag, Sweden

[21] Appl. No.: 144,726

[22] Filed: Jan. 14, 1988

Related U.S. Application Data

[63] Continuation of Ser. No. 885,423, Jul. 14, 1986, abandoned.

[30] Foreign Application Priority Data

Aug. 8, 1985 [SE] Sweden .................................. 8503747

[51] Int. Cl.$^4$ ............................................. A01D 34/64
[52] U.S. Cl. .......................................... 56/14.7; 56/6; 180/235; 180/14.4
[58] Field of Search ......................... 56/10.1, 6, 7, 14.7, 56/249; 180/14.4, 235, 138; 280/492

[56] References Cited

U.S. PATENT DOCUMENTS

| | | | |
|---|---|---|---|
| 2,582,177 | 1/1952 | Swisher et al. | 180/14.4 |
| 3,110,352 | 11/1965 | McClarnon | 56/14.7 |
| 3,187,821 | 6/1965 | Kamlukin | 56/DIG. 22 |
| 3,299,982 | 1/1967 | Bacon | 180/235 |
| 4,487,006 | 12/1984 | Scag | 56/14.7 |

FOREIGN PATENT DOCUMENTS

| | | | |
|---|---|---|---|
| 289954 | 6/1965 | Netherlands | 56/11.8 |
| 478857 | 1/1938 | United Kingdom | 180/235 |

*Primary Examiner*—John Weiss
*Attorney, Agent, or Firm*—Alfred E. Miller

[57] ABSTRACT

The invention relates to a mower comprising a chassis which is provided with an engine. The chassis consists of a front and a rear section each section being provided with a pair of wheels and the front section supports a cutting attachment. The front and at least a part of the rear section are pivotally connected to each other so that they can be turned mainly about a vertical steering axis and about a mainly horizontal swinging axis. The steering axis (29) and the swinging axix (42) is placed considerably closer to the wheel axis of the rear section (13) than the wheel axis of the front section (12) preferably so that the distance (a) between the steering axis (29) and the wheel axis of the rear section (13) is less than ⅓ of the distance (b) between the two wheel axis.

2 Claims, 3 Drawing Sheets

RIDING MOWER

This application is a continuation of application Ser. No. 885,423 abandoned 3/24/88.

This invention relates to a mower having a chassis with an engine and comprising a front and rear section, each section being provided with a pair of wheels, the front section supporting a cutting attachment, the front section and at least a part of the rear section being pivotally connected to each other so that they can be turned about a mainly vertical steering axis and about a mainly horizontal swinging axis.

BACKGROUND OF THE INVENTION

Mowers of the riding type are previously known. Such machines can be provided with front mounted cutting attachments and cutting attachments which are centrally placed between the front- and rearwheels respectively.

The engine can be placed in front of or behind the driver and further there are front wheel- and rearwheel steering and driving. Each type has its own advantages and drawbacks. For instance mowers with centrally placed cutting attachments generally have the drawback that the front wheel presses down the grass before it reaches the cutting attachment which means that parts of a lawn are badly cut. A mower having a front mounted cutting attachment, rear mounted engine and rear wheel steering gives a good survey of the cutting attachment and the surface to be cut whereas the drawback is a large turning radius since the steering angle is limited with the respect to the friction between the lawn and the steering wheels. A rear wheel driven machine with the engine at the rear, centrally placed cutting attachment and with front wheel steering gives advantages with respect to the transmission because of the short distance between the engine and driving wheels and cutting attachment respectively but gives an even large turning radius since the centrally placed cutting attachment creates a larges wheel basis then machines having front mounted attachments. In order to shorten the time during shunting in connection with turnings it is desirable that a machine has as short turning radius as possible.

In a type of machine which is a rather good compromise between different wishes the chassis comprises two sections which are pivotally connected to each other half way between the front and rear wheels. The front section of the chassis supports the two front wheels which are mounted on separate shafts, the cutting attachment which is placed ahead of the front wheels and the operator. The rear section supports engine with gear box, differential gearing and rear shaft, the steering being effected by turning the rear section with respect to the front section about a vertical steering axis. The pivot point is in this machine so designed that turning the rear section with respect to the front section also can be effected about a swinging axis which is directed in the travelling direction of the mower and horizontally placed on the front section in order to make it possible for the wheels to follow irregularities on the ground.

Even if the machine described above in most respects has rather good characteristics, its turning radius is after all limited to something which corresponds to about 45° turn of angle of the rear section. This depends on that the rear wheels—with the reasonable length of the machine—when being further turned would get in touch with the front wheels and that further turning of the wheels would lead to too large variation in the ground pressure between the two driving wheels because of the position of the swinging axis. At a certain steering angle the ground pressure on the inner wheel becomes so small that driving ceases. The ground pressure of this wheel can even become negative that is the wheel is lifted from ground which causes the risk for tipping. Moreover the cutting attachment of this machine cannot be driven directly by one single belt from the engine since the distance between engine and cutting attachment changes with the steering angle. Further drawbacks are that there is a demand for operating devices on the engine following its movement and that a certain undesirable selfguiding is achieved because the grass during cutting brakes the knives which causes a moment between the two sections of the machine.

Summary of the Invention

The purpose of this invention is to achieve a mower which offers the maximum utility by reducing the turning radius with respect to known machines at the same time as the risk for slipping to reduced to minimum as is also the risk for tipping, and where the other drawbacks referred to above are eliminated. This purpose is achieved with the device according to the invention .

BRIEF DESCRIPTION OF THE DRAWINGS

An embodiment of the invention will now be described with reference to the accompanying drawings where FIG. 1 is a longitudinal vertical section of a device according to the invention whereas

DESCRIPTION OF THE PREFERRED EMBODIMENT

Figure 1:
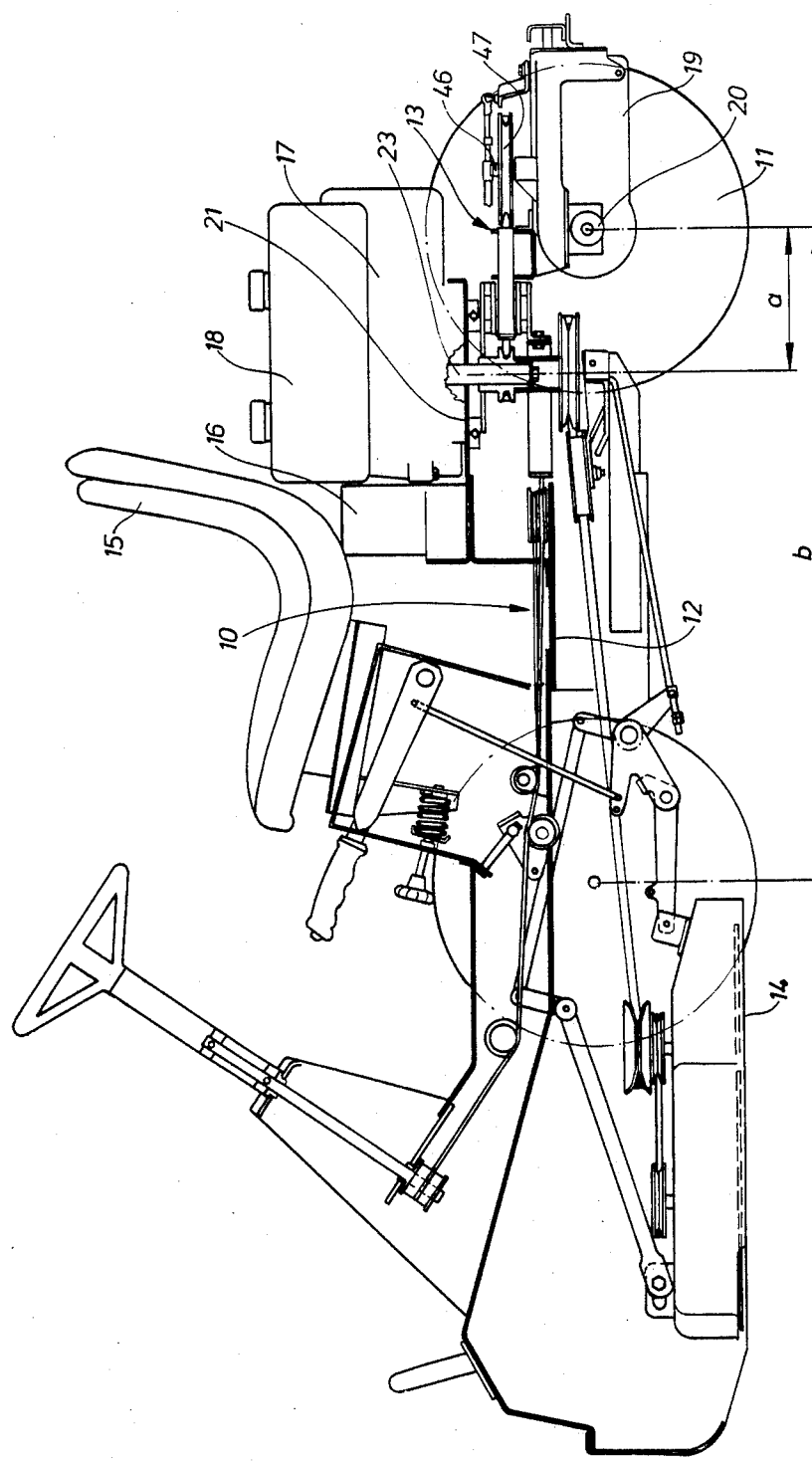
Figure 2:
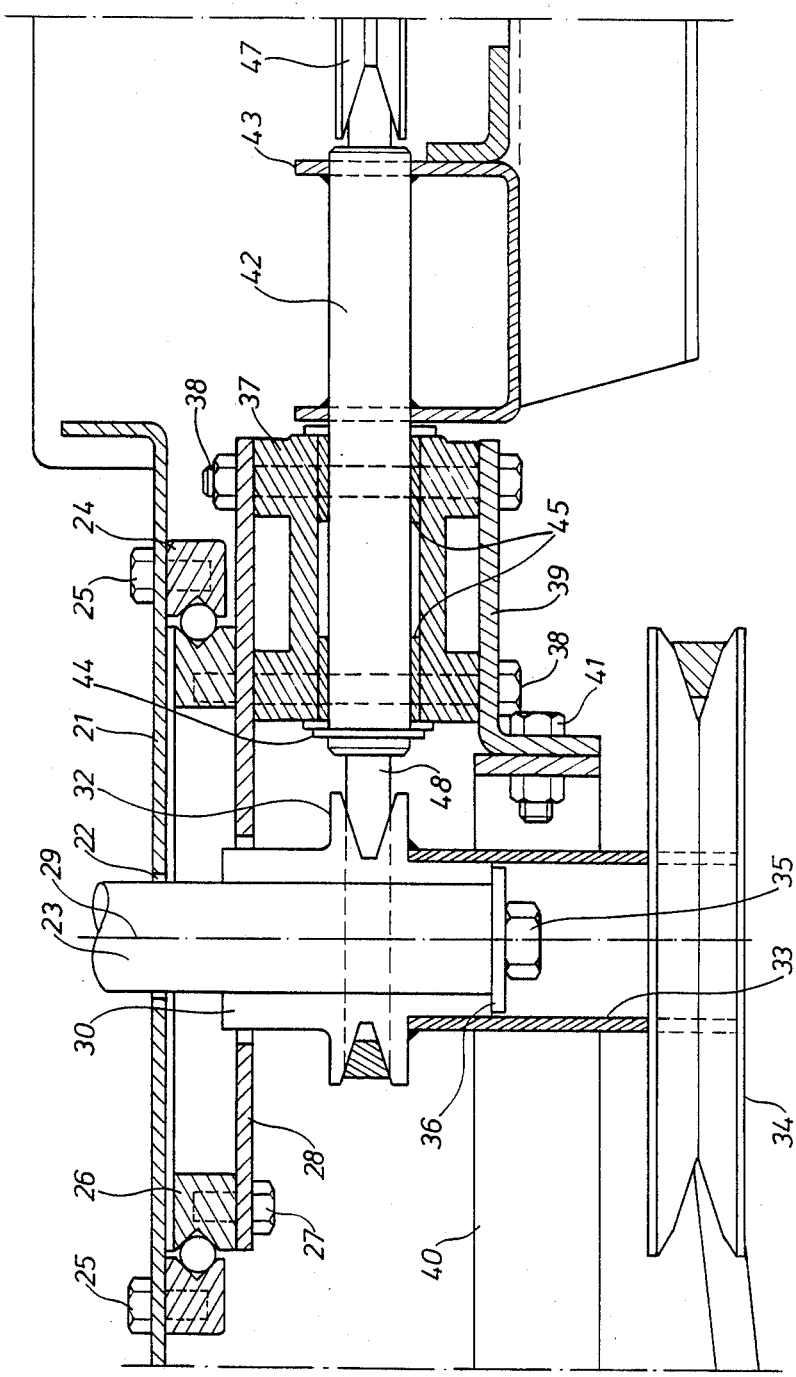
FIG. 2 is a longitudinal vertical section of the rear part of the device according to the invention and FIG. 3 is a vertical section of a modified embodiment according to the invention.

As is shown as FIGS. 1 and 2 the mower comprises a chassis generally denoted with reference numeral 10. The chassis has a front pair of wheels and a rear pair of wheels 11 and comprises two sections 12 and 13 respectively. The front section 12 supports a cutting attachment schematically denoted 14, a seat 15 for the driver, necessary handling devices and a battery 16, engine 17 and gas tank 18. The rear section 13 supports a gear box 19 with differential gear and a rear shaft 20 which drives a rear pair of wheels 11.

In order to support the engine 17 the rear part of the chassis front section 12 is shaped as a support plate 21 with a hole 22 through which the output shaft 23 of the engine extends vertically downwards. To the supporting plate 21 an outer ring 24 of a ball bearing with a large diameter is fastened by means of several screws 25. The inner ring 26 of the ball bearing is by means of screws 27 connected to a turning plate 28. The turning plate moves about a steering axis 29 and has a hole through which the output shaft of the engine extends. The output shaft 23 of the engine at its lower part supports a hub 30 which has an upper pulley 32 with a comparatively small diameter for driving the wheels of the mower, the pulley being fixed to a sleeve 33 which is concentric to the output shaft 23 and which supports a lower pulley 34 with a comparatively large diameter intended to drive the cutting attachment.

The pulleys 32 and 34 are fastened to the output shaft 23 of the engine by means of a bolt 35 and a washer 36. Thus, the turning plate 28 is turnable about the output shaft 23 of the engine and has a bearing holder 37 which by means of bolts 38 is fastened to the turning plate 28 as well as to a bracket 39 on which a steering plate 40 is provided by means of bolts 41. The steering plate 40 is via a wire connected to the steering wheel of the mower. In the bearing holder 37 a dowel 42 is notatably secured. The dowel extends horizontally rearwards and one of its ends has a clamp 43 which is an intergrated part of the rear section 13 of the chassis whereas its front end as a locking washer 44 which prevents the dowel from falling out of the bearing holder 37. The dowel rests in two sliding bearings, which are pressed into the bearing holder.

The gear box has an input shaft 46 which is vertically disposed and is provided with a pulley 47 which is drive from said upper pulley 32 by means of a belt 48.

As seen in FIG. 2 the upper pulley 32 and the pulley 47 on the input shaft of the gear box are situated in the same horizontally plane as the dowel 42 in order to reduce the tendency of the belt to pull off the pulleys when there is rotation about the horizontal axis.

By acting on the steering wheel, the steering plate 40 will be turned so that the rear section 13 turns about the vertical shaft of the engine 23. Since the rear section 13 is comparatively short compared to the front section 12 and in combination with the position of the pivot 37, 42, 45 on the short chassis section, larger steering angles or larger variations between the ground pressure of the driving wheels can be allowed without the risk of tipping than in previously known arrangements, which in turn means reduced turning radius. Any irregularities on the ground will, as said above be taken up as a turning movement of the rear shaft about horizontal longitudinal axis.

Figure 3:
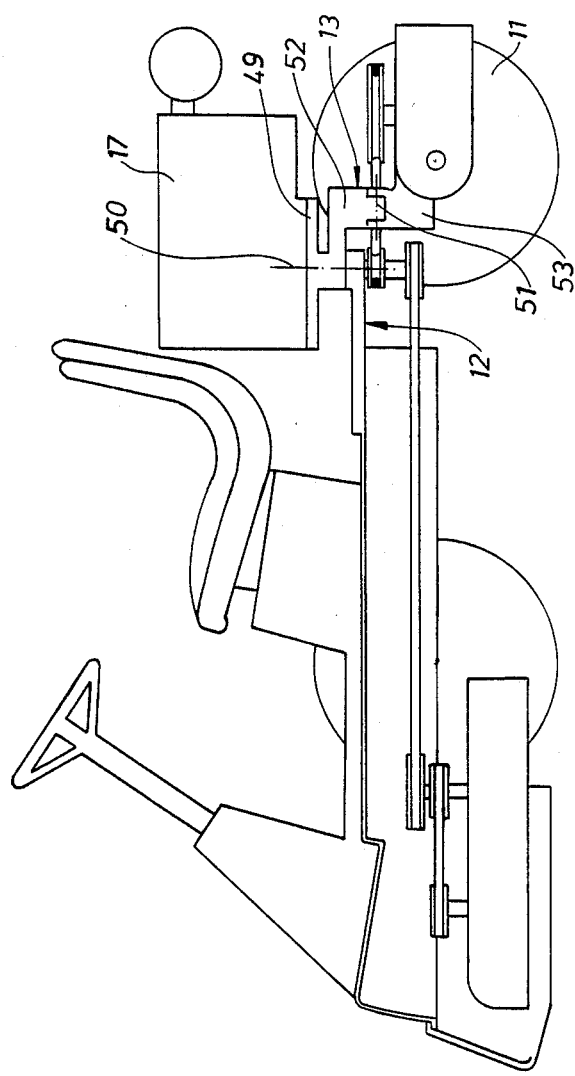

The device shown in FIG. 3 differs from what has been shown in FIG. 1 mainly because the engine is placed on a supporting plate 49 which is a part of the rear section 13 of the chassis, the supporting plate 49 and engine 17 together being turnable or portable about the vertical axis 50 coinciding with the shaft of the engine. The supporting plate is via a swinging axis 52 fastened to one of two to each other linked parts 52, 53 which means that the rear shaft 20 may achieve different angle positions with respect to the horizontal plane.

The turning plate moves about the vertical steering shaft 29 which coincides with the motor shaft 23, the steering axis being placed considerably closer to the wheel axis of the rear section 13 than the wheel axis of the front section 12. Preferably the distance a between the steering axis 29 and the wheel axis of the rear section 13 is less than ⅓ of the distance b between the two wheel axis.

I claim:

1. In an engine-driven riding mower having a chassis provided with separate front and rear sections, an engine mounted on said rear section, a cutting attachment supported by said front section and driven by said engine, the improvement comprising a pair of front wheels operatively connected to said front section and a pair of rear driving wheels operatively connected to said rear section, said rear driving wheels having an axis, means for steering said rear driving wheels and including a vertical steering axis about which said rear driving wheels turn, said vertical steering axis being located in the rear of said mower chassis at a distance from the rear wheel axis which is less than ⅓ of the distance between the front and rear wheel axes, and a horizontal swinging axis which is substantially perpendicular to said rear wheel axis, said horizontal swinging axis being placed at said vertical axis location and additionally positioned centrally between said driving wheels, and said engine being provided with an output shaft that is concentric with said vertical steering axis.

2. A riding mower as claimed in claim 1 wherein said rear section is provided with a gear box with a differential gear, a rear shaft for transmitting a driving force to said rear pair of wheels, and a belt wherein the transmission of force between the engine and gear box is created by said belt which is located in the same plane as said horizontal swinging axis.

* * * * *